(12) United States Patent
Ratasuk et al.

(10) Patent No.: US 8,625,442 B2
(45) Date of Patent: Jan. 7, 2014

(54) METHOD AND APPARATUS FOR DETERMINING WHEN TO USE CONTENTION-BASED ACCESS FOR TRANSMITTING DATA IN A WIRELESS NETWORK

(75) Inventors: Rapeepat Ratasuk, Hoffman Estates, IL (US); Igor Filipovich, Chicago, IL (US); Rangsan Leelahakriengkrai, Streamwood, IL (US); Ivan N. Vukovic, Arlington Heights, IL (US)

(73) Assignee: Motorola Mobility LLC, Libertyville, IL (US)

( * ) Notice: Subject to any disclaimer, the term of this patent is extended or adjusted under 35 U.S.C. 154(b) by 293 days.

(21) Appl. No.: 12/859,545

(22) Filed: Aug. 19, 2010

(65) Prior Publication Data

US 2012/0044816 A1   Feb. 23, 2012

(51) Int. Cl.
H04L 12/26   (2006.01)
H04W 76/02   (2009.01)
H04W 4/00   (2009.01)

(52) U.S. Cl.
USPC ............................ 370/252; 370/328; 370/329

(58) Field of Classification Search
USPC .................. 370/241, 252, 310, 328, 329
See application file for complete search history.

(56) References Cited

U.S. PATENT DOCUMENTS

| 7,778,151 B2 * | 8/2010 | Bertrand et al. ............... 370/208 |
| 8,036,110 B2 * | 10/2011 | Ishii et al. .................... 370/229 |
| 2007/0206531 A1 * | 9/2007 | Pajukoski et al. ............. 370/329 |
| 2008/0081564 A1 | 4/2008 | Rao |
| 2008/0095263 A1 | 4/2008 | Xu et al. |
| 2009/0103558 A1 | 4/2009 | Zangi et al. |
| 2009/0232076 A1 | 9/2009 | Kuo |
| 2009/0257408 A1 | 10/2009 | Zhang et al. |
| 2009/0274105 A1 | 11/2009 | Choi et al. |
| 2010/0091724 A1 * | 4/2010 | Ishii et al. .................... 370/329 |
| 2010/0232318 A1 | 9/2010 | Sarkar |

(Continued)

FOREIGN PATENT DOCUMENTS

| EP | 2154927 A1 | 2/2010 |
| WO | 2007078177 A1 | 7/2007 |
| WO | 2008039142 A1 | 4/2008 |
| WO | 2010057540 A1 | 5/2010 |

OTHER PUBLICATIONS

Nokia Siemens Networks et al: "Triggers for Power Headroom Reports in EUTRAN Uplink", 3GPP Draft; R1-081464, 3rd Generation Partnership Project (3GPP), Mobile Competence Centre ; 650, Route Des Lucioles ; F-06921 Sophia-Antipolis CEDEX; France, vol. RAN WG1, No. Shenzhen, China; 20080326, Mar. 26, 2008, XP050109881, [retrieved on Mar. 26, 2008], all pages.

(Continued)

Primary Examiner — Chi Pham
Assistant Examiner — Robert Lopata

(57) ABSTRACT

A wireless communication system as described here employs control signaling for contention-based uplink access from user equipment devices to a base station. Contention-based access configuration is performed via physical downlink control channel signaling. Configuration data sent to the user equipment devices identifies multiple contention-based access zones, along with minimum power headroom values for each contention-based access zone. A probability factor may also be used to lower collision possibility by influencing whether the user equipment devices perform contention-based uplink access. An uplink grant message can be used to acknowledge contention-based transmission; contention resolution is achieved implicitly via the uplink grant.

14 Claims, 11 Drawing Sheets

(56) References Cited

U.S. PATENT DOCUMENTS

| | | | |
|---|---|---|---|
| 2010/0238872 A1* | 9/2010 | Kim et al. | 370/329 |
| 2010/0291865 A1 | 11/2010 | Gore et al. | |
| 2010/0296460 A1* | 11/2010 | Akimoto et al. | 370/329 |
| 2011/0039568 A1 | 2/2011 | Zhang et al. | |
| 2011/0211522 A1* | 9/2011 | Chung et al. | 370/315 |
| 2011/0237288 A1 | 9/2011 | Ratasuk et al. | |
| 2011/0261776 A1* | 10/2011 | Ahn et al. | 370/329 |
| 2011/0268045 A1* | 11/2011 | Heo et al. | 370/329 |
| 2012/0039286 A1* | 2/2012 | Okubo et al. | 370/329 |
| 2012/0044816 A1 | 2/2012 | Ratasuk et al. | |
| 2012/0044877 A1 | 2/2012 | Ratasuk et al. | |
| 2012/0044878 A1 | 2/2012 | Ratasuk et al. | |
| 2012/0064936 A1 | 3/2012 | Vrzic et al. | |
| 2012/0113938 A1 | 5/2012 | Larsson et al. | |

OTHER PUBLICATIONS

CATT: "The solution of the Contention Based Uplink Transmission", 3GPP Draft; R2-102803, 3rd Generation Partnership Project (3GPP), Mobile Competence Centre ; 650, Route Des Lucioles ; F-06921 Sophia-Antipolis CEDEX; France, vol. RAN WG2, No. Montreal, Canada; 20100510, May 4, 2010, all pages.

Ericsson et al: "Impacts of contention based uplink in RAN2", 3GPP Draft; R2-100125 Impacts of Contention Based Uplink in RAN2, 3rd Generation Partnership Project (3GPP), Mobile Competence Centre ; 650, Route Des Lucioles ; F-06921 Sophia-Antipolis CEDEX; France, vol. RAN WG2, No. Valencia, Spain;20100118, Jan. 12, 2010, all pages.

Patent Cooperation Treaty, International Search Report and Written Opinion of the International Searching Authority for International Application No. PCT/US2011/048029, Oct. 31, 2011, 15 pages.

ZTE: "Discussion on contention resolution of CB transmission", 3GPP Draft; R2-101101, 3rd Generation Partnership Project (3GPP), Mobile Competence Centre ; 650, Route Des Lucioles ; F-06921 Sophia-Antipolis CEDEX; France, vol. RAN WG2, No. San Francisco, USA; 20100222, Feb. 22, 2010, all pages.

CATT: "The Feedback and Retransmission for the Contention Based Transmission", 3GPP Draft; R2-101059, 3rd Generation Partnership Project (3GPP), Mobile Competence Centre ; 650, Route Des Lucioles ; F-06921 Sophia-Antipolis CEDEX; France, vol. RAN WG2, No. San Francisco, USA;20100222, Feb. 12, 2010, all pages.

Patent Cooperation Treaty, International Search Report and Written Opinion of the International Searching Authority for International Application No. PCT/US2011/044108, Nov. 23, 2011, 13 pages.

Ericsson et al: "Stage 2 description of the contention based uplink", 3GPP Draft; 36300_CRXXXX_(REL-I0)_R2-100126 Stage 2 Description of the Contention Based Uplink, 3rd Generation Partnership Project (3GPP), Mobile Competence Centre ; 650, Route Des Lucioles ; F-06921 Sophia-Antipolis CEDEX ; France, vol. RAN WG2, No. Valencia, Spain; 20100118, Jan. 12, 2010, p. 6-7.

Patent Cooperation Treaty, International Search Report and Written Opinion of the International Searching Authority for International Application No. PCT/US2011/045468, Dec. 6, 2011, 14 pages.

Ericsson: "Details of latency reduction alternatives", 3GPP TSG-RAN WG2 #69, R2-101332, San Fransisco, USA, Feb. 22-25, 2010, all pages.

Samsung: "Retransmission scheme for contention based access", 3GPP TSG-RAN2 #69bis Meeting, Beijing, China, Apr. 12-16, 2010, R2-102461, all pages.

Mediatek: "Discussion on Operations of Contension-based Transmission", 3GPP TSG-RAN WG2 Meeting #69bis, Beijing, China, Apr. 12-16, 2010, R2-102208, all pages.

Fan Ng, USA Office Action (12859514), mailed Aug. 22, 2012, all pages.

Noel R. Beharry, USA Office Action (12859620), mailed Jul. 31, 2012, all pages.

United States Patent and Trademark Office "Non-Final Office Action" for U.S. Appl. No. 12/859,620 (BCS06300) dated Apr. 23, 2013, 11 pages.

* cited by examiner

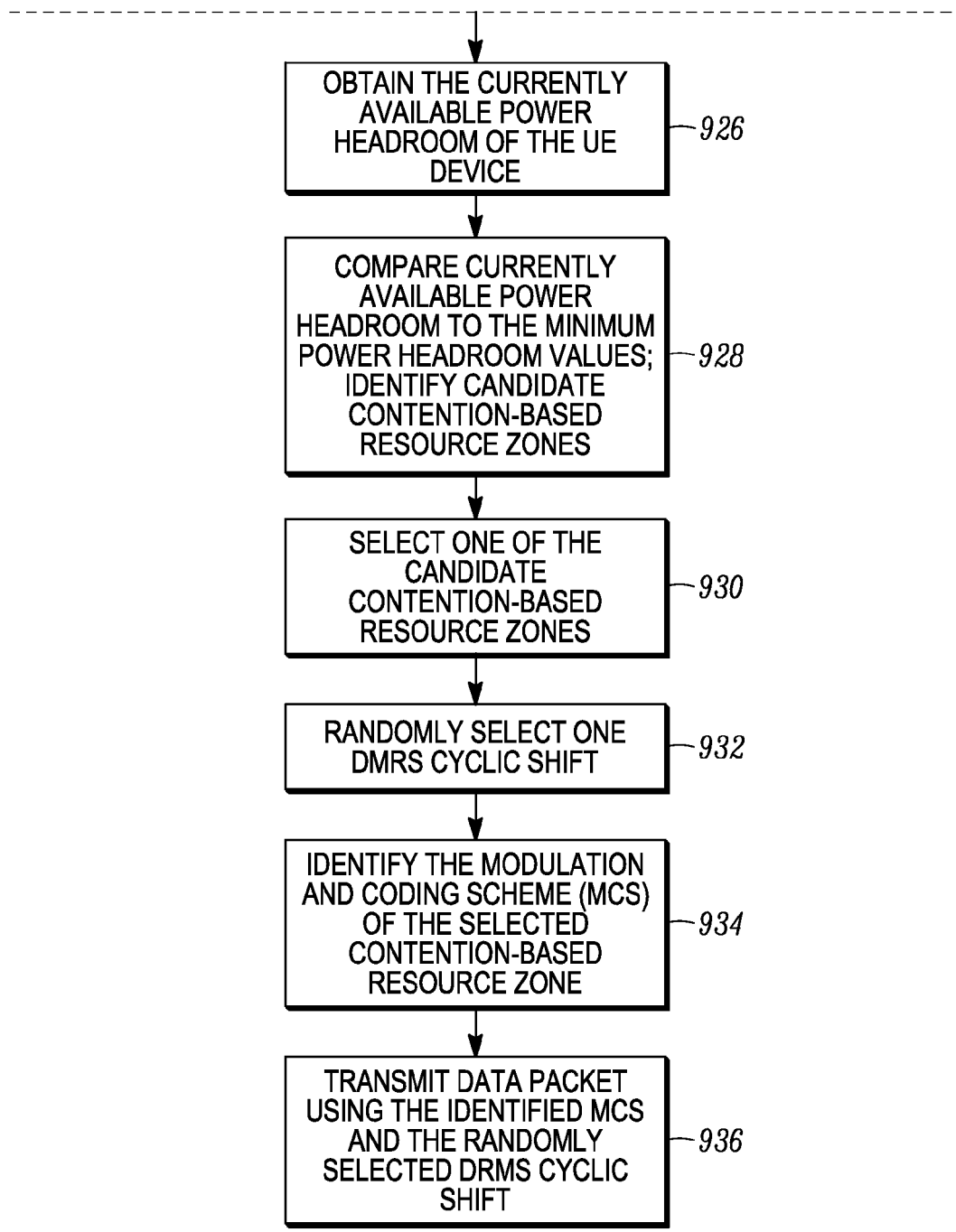
FIG. 9 CONTD.

METHOD AND APPARATUS FOR DETERMINING WHEN TO USE CONTENTION-BASED ACCESS FOR TRANSMITTING DATA IN A WIRELESS NETWORK

CROSS REFERENCE TO RELATED APPLICATIONS

This application is related to co-owned U.S. patent application Ser. No. 12/859,514, entitled METHOD AND APPARATUS FOR USING CONTENTION-BASED RESOURCE ZONES FOR TRANSMITTING DATA IN A WIRELESS NETWORK and filed concurrently herewith.

This application is related to co-owned U.S. patent application Ser. No. 12/859,620, entitled METHOD AND APPARATUS FOR PROVIDING CONTENTION-BASED RESOURCE ZONES IN A WIRELESS NETWORK and filed concurrently herewith.

TECHNICAL FIELD

Embodiments of the subject matter described herein relate generally to wireless communication systems. More particularly, embodiments of the subject matter relate to techniques, procedures, and technologies that support contention-based uplink access in a wireless communication system.

BACKGROUND

Wireless communication systems are well known, and the operation of wireless communication systems are usually governed by published specifications, standards, and operating protocols. For example, Long Term Evolution (LTE) refers to a recent standard for mobile network technology, and the current LTE specification is published by the 3rd Generation Partnership Project (3GPP). LTE Advanced (LTE-A) is a proposed extension of LTE that is expected to be finalized in the year 2011.

A wireless device in an LTE system (i.e., a user equipment or UE device) may experience undesirable amounts of latency associated with power-up, initialization, and/or connection to the wireless network. Contention-based uplink access has been proposed as a way to reduce such latency. Contention-based uplink access would allow multiple UE devices to compete for uplink resources on a shared channel supported by the base station, in addition to or in lieu of the traditional uplink access scheme that utilizes dedicated and scheduled resources.

A successful deployment of contention-based uplink access will leverage certain access mechanisms, communication protocols, and procedures performed by the UE devices and the base station. Accordingly, it is desirable to have effective and reliable techniques and technologies that enable a wireless communication system to employ contention-based uplink access from UE devices to base stations.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented, and one or more processor devices can carry out the described operations, tasks, and functions by manipulating electrical signals representing data bits at memory locations in the system memory, as well as other processing of signals. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The subject matter presented here relates to a wireless communication system. More particularly, the subject matter relates to an orthogonal frequency division multiplexing (OFDM) based system having one or more base stations, each servicing one or more wireless devices. The particular system embodiment described here represents a wireless communication system that operates (at least in part) in accordance with the LTE specification. Moreover, the system embodiment described here is intended for operation (at least in part) in accordance with the proposed LTE-A specification. It should be appreciated that the subject matter is not limited or otherwise restricted to an LTE or an LTE-A deployment, and that the techniques, methodologies, procedures, and protocols described here could be extended for use in other system configurations. As one of ordinary skill in the art will recognize, a variety of LTE specifications are available from the 3GPP.

Figure 1:
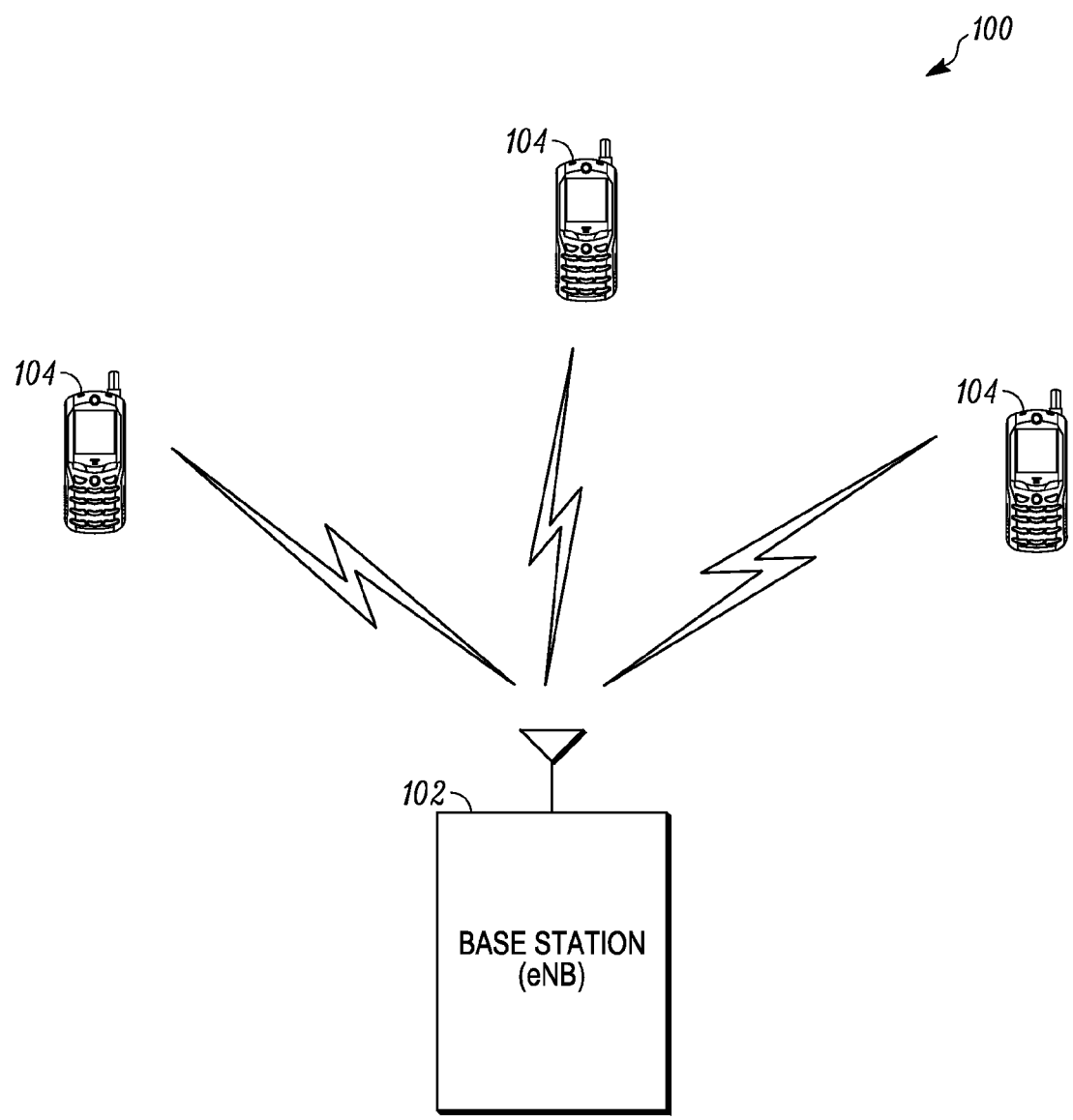
FIG. 1 is a simplified diagram that illustrates an exemplary wireless communication system.

FIG. 1 is a simplified diagram that illustrates an exemplary wireless communication system 100. For this example, the system 100 is an OFDM based LTE system. In this regard, many of the fundamental and basic operating features, characteristics, and functions of the system 100 are compatible with the published LTE specifications. Accordingly, conventional and well known aspects of the system 100 will not be described in detail here. The simplified embodiment of the system 100 includes a base station that communicates with three wireless devices. For consistency with LTE terminology, the base station will be referred to herein as an evolved NodeB, eNodeB, or eNB, and a wireless device will be referred to herein as a user equipment device, a UE device, or simply a UE. Thus, FIG. 1 shows one eNB 102 and three UE devices 104 in the system 100. It should be appreciated that a practical deployment of the system 100 could include any number of eNBs 102 (depending on the desired wireless coverage area), and that each eNB 102 could support more or less than three UE devices 104.

Figure 2:
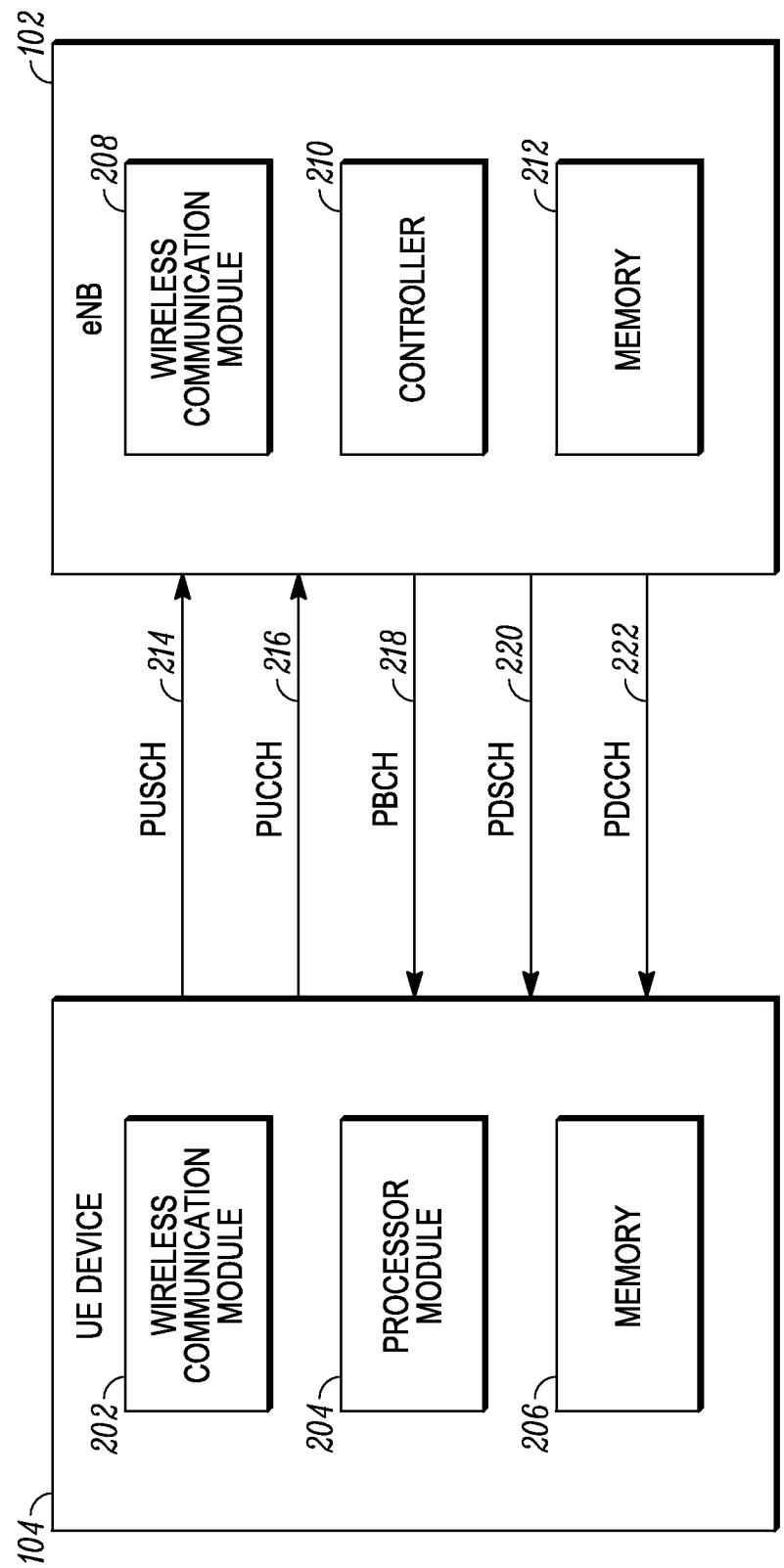
FIG. 2 is a simplified diagram that illustrates a user equipment device and a base station.

FIG. 2 is a simplified diagram that illustrates one UE device 104 and the eNB 102, along with several data communication channels (uplink from the UE device 104 to the eNB 102, and downlink from the eNB 102 to the UE device 104) established between them. The UE device 104 generally includes, without limitation: a wireless communication module 202; a processor module 204; and a suitable amount of memory 206. These elements of the UE device 104 are operatively coupled together using an appropriate interconnection architecture or arrangement, as is well understood. The eNB 102 generally includes, without limitation: a wireless communication module 208; a controller 210; and a suitable amount of memory 212. These elements of the eNB 102 are operatively coupled together using an appropriate interconnection architecture or arrangement, as is well understood. In practice, the UE device 104 and the eNB 102 will include additional components, functionality, logic, and elements that are suitably configured to perform conventional operations and procedures that are unrelated to the particular subject matter described here. For the sake of brevity and clarity, such conventional items will not be described in detail here.

The wireless communication module 202 may be implemented as a transceiver and one or more antennas. In certain embodiments, the wireless communication module 202 utilizes a plurality of antennas that cooperate to support Multiple Input Multiple Output (MIMO) communication. The wireless communication module 202 can send uplink messages and uplink control signaling information to the eNB 102, while receiving downlink messages and downlink control signaling information from the eNB 102. For this embodiment, the wireless communication module 202 can transmit data packets using the LTE frame structure. In LTE, each radio frame consists of ten subframes, and each subframe is one millisecond long. Each subframe is comprised of control and data portions. In the downlink, the control part consists of information regarding the size of the control part in number of OFDM symbols, acknowledgements pertaining to past uplink data transmissions, uplink/downlink grants, and power control fields. The data part consists of data packets to one or more UEs. In the uplink, the control part consists of information regarding channel state information, scheduling request indication, and acknowledgements pertaining to past downlink data transmissions. The data part consists of data packets to one or more UEs.

For this particular embodiment, the wireless communication module 202 supports the following wireless channels: a physical uplink shared channel (PUSCH) 214; a physical uplink control channel (PUCCH) 216; a physical broadcast channel (PBCH) 218; a physical downlink shared channel (PDSCH) 220; and a physical downlink control channel (PDCCH) 222. The PUSCH 214 can be shared by a plurality of UE devices in the system 100 for purposes of data transmission. Moreover, uplink access via the PUSCH 214 may be contention-based and/or scheduled (as described in more detail below). The PUCCH 216 carries uplink control information (e.g., uplink scheduling requests, ACK/NACK information, and channel quality information). In this regard, the PUCCH 216 is considered to be a signaling channel between the UE device 104 and the eNB 102. The PBCH 218 carries cell-specific control information from the eNB 102 to the UE devices within range of the transmitting eNB 102. The PDSCH 220 is utilized for data and multimedia transport from the eNB 102 to the UE device 104. The PDCCH 222 conveys control information for the UE devices. In this regard, the PDCCH 222 is considered to be a signaling channel between the eNB 102 and the UE device 104.

The processor module 204 is operatively associated with the wireless communication module 202, and it can process and analyze information and data received by the wireless communication module 202, and process and prepare information for transmission by the wireless communication module 202. The processor module 204 may include or be implemented with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. A processor device utilized by the processor module 204 may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. In practice, the processor module 204 may include one processor device or a plurality of cooperating processor devices.

The memory 206 may be realized as RAM memory, flash memory, EPROM memory, EEPROM memory, registers, a hard disk, a removable disk, or any other form of storage medium known in the art. In this regard, the memory 206 can be coupled to the processor module 204 such that the processor module 204 can read information from, and write information to, the memory 206. In the alternative, the memory 206 may be integral to the processor module 204. As an example, the processor module 204 and the memory 206 may reside in an ASIC. In practice, a functional or logical component of the UE device 104 and/or one or more applications executed by the UE device 104 might be realized using program code that is maintained in the memory 206. Moreover, the memory 206 can be used to store data utilized to support the operation of the UE device 104, including, without limitation, contention-based configuration data, an identifier of the UE device 104, buffered data to be transmitted by the wireless communication module 202, and the like (as will become apparent from the following description).

For the eNB 102, the wireless communication module 208 may be implemented as a transceiver and one or more antennas. In certain embodiments, the wireless communication module 208 utilizes a plurality of cooperating antennas that support MIMO communication. The wireless communication module 208 can send downlink messages and downlink control signaling information to the UE device 104, while receiving uplink messages and uplink control signaling information from the UE device 104. For this embodiment, the wireless communication module 208 can transmit data packets using the LTE frame structure. Notably, the wireless communication module 208 also supports the various channels described above with reference to the wireless communication module 202, namely, the PUSCH 214, the PUCCH 216, the PBCH 218, the PDSCH 220, and the PDCCH 222.

The controller 210 is operatively associated with the wireless communication module 208, and it can process and analyze information and data received by the wireless communication module 208, and process and prepare information for transmission by the wireless communication module 208. The controller 210 may include or be implemented with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. A processor device utilized by the controller 210 may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. In practice, the controller 210 may include one processor device or a plurality of cooperating processor devices.

The memory 212 may be realized in the manner described above for the memory 206 of the UE device 104. Moreover, a functional or logical component of the eNB 102 and/or one or more applications executed by the eNB 102 might be realized using program code that is maintained in the memory 212. Moreover, the memory 212 can be used to store data utilized to support the operation of the eNB 102, including, without limitation, contention-based configuration data, resource allocation information, and the like (as will become apparent from the following description).

Power-up latency and network connection latency experienced by UE devices in a wireless network can be annoying and frustrating to users. In an LTE based system, some of this latency can be attributed to the manner in which physical resources are dedicated to UE devices in a time scheduled manner. In contrast, the system 100 described here utilizes contention-based uplink access as a way to reduce latency experienced by the UE devices 104. Such latency reduction is achieved because a UE device 104 need not transmit a scheduling request indicator (SRI) and wait for an uplink grant issued by the eNB 102 before sending its data. Rather, when using contention-based uplink access, the UE devices 104 are allowed to transmit data on a designated and reserved PUSCH region, and an identifier (such as the cell radio network temporary identifier or C-RNTI) is added to the uplink message to identify the transmitting UE device. This methodology is most beneficial under low system load conditions where most resource blocks are not being used. The contention-based uplink access methodology can also be used for machine-type communication (i.e., machine to machine communication) to possibly lower overhead associated with uplink data transmission. To support such contention-based access, standardized mechanisms and procedures should be defined and implemented. In this regard, the following description addresses certain control signaling for contention-based access and presents a preliminary UE procedure for contention-based access.

Figure 3:
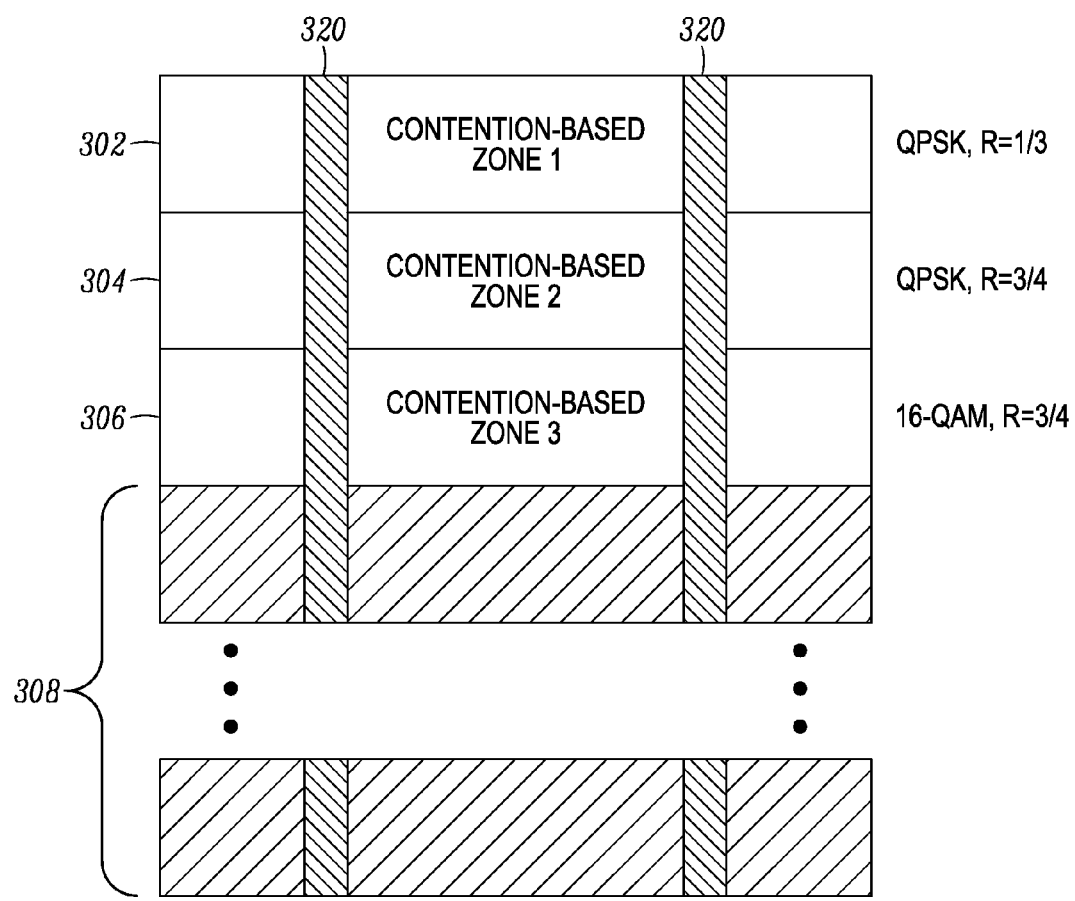
FIG. 3 is a diagram that schematically depicts an exemplary allocation of physical resource blocks for a wireless communication system.

FIG. 3 is a diagram that schematically depicts an exemplary allocation of physical resource blocks for the system 100. In this example, three contention-based resource zones 302, 304, 306 are defined. In practice, however, any number of contention-based resource zones could be utilized. Notably, any UE device serviced by an eNB is able to use the contention-based resource zones 302, 304, 306 because, by definition, those zones are associated with shared (not dedicated) resources. FIG. 3 also depicts an area 308 corresponding to assigned or dedicated resources that are utilized for traditional schedule based uplink access. As described in more detail below, certain situations might call for scheduled uplink access using dedicated physical resources rather than contention-based access. Moreover, contention-based uplink access can be used for an initial amount of data to be transmitted by a UE device, and additional data can follow using scheduled uplink transmission. Accordingly, the area 308 of assigned or dedicated resources may be utilized in a conventional manner for purposes of scheduled uplink access.

FIG. 3 also schematically depicts the available demodulation reference signal (DMRS) 320 that are available for use by the UE devices during contention-based uplink transmissions. In this context, a DMRS and associated cyclic shift represents a pilot signal used by the transmitting UE device, as is well understood by one of ordinary skill in the art. In certain embodiments, a UE device randomly selects a DMRS cyclic shift when transmitting on a contention-based access zone. This feature provides support for spatial separation and increases the likelihood that the eNB will successfully decode uplink access transmissions from more than one UE device when collisions do occur. This also allows the eNB to detect collisions even if the PUSCH cannot be decoded because the eNB can detect that different DMRS cyclic shifts are being transmitted on the contention-based zone using energy detection. Thus, although the eNB cannot decode the data packets due to collision, it can detect the collision itself.

The contention-based resource zones 302, 304, 306 are used for the PUSCH 214 (see FIG. 2), i.e., they are used for uplink access to the eNB 102. Each of the contention-based resource zones 302, 304, 306 includes a respective number of physical resource blocks (PRBs). For purposes of this description, a PRB in a contention-based resource zone is defined as a group of subcarriers by a number of OFDM symbols. (For example, for a normal cyclic prefix subframe in LTE, a PRB is 12 subcarriers in frequency and 14 OFDM symbols in time.)

Notably, each of the contention-based resource zones 302, 304, 306 has a respective modulation and coding scheme (MCS) assigned thereto; in certain implementations, each contention-based resource zone has a different MCS assigned thereto. For example, and without limitation, the zone 302 may be assigned an MCS corresponding to QPSK and R=1/3 (where R represents coding rate), the zone 304 may be assigned an MCS corresponding to QPSK and R=3/4, and the zone 306 may be assigned an MCS corresponding to 16-QAM and R=3/4. It should be appreciated that different modulation and/or coding techniques could be utilized in an embodiment of the system 100, and that these examples are not exhaustive or required.

For this particular embodiment, UE devices are allowed to transmit in one of the contention-based resource zones 302, 304, 306 using the predefined MCS and Transport Block Size (TBS) assignment given in the grant (in this context, TBS refers to the amount of data in bits that the UE can transmit in a particular zone). This particular grant provides information about the contention-based resource zones i.e., the PDCCH-based configuration described below). A minimum power headroom restriction may be implemented so that a UE device is not allowed to transmit in a particular zone if the assigned MCS cannot be supported by that UE device (e.g., UE devices at the cell edge are not allowed to transmit in 16-QAM zones). In this case, the grant is common to all UEs and it provides information about MCS, TBS, power headroom, and possibly other parameters that UEs using contention-based access can read.

Contention-based access parameters of the UE devices can be configured semi-statically via radio resource control (RRC) signaling, dynamically or in a semi-persistent manner via PDCCH assignment. RRC signaling incurs the least amount of overhead, however the process is slow and, because RRC signaling is common, all UE devices will be required to read and update the RRC signaling information in their internal databases. Although the timing of RRC signaling may vary from one network to another, RRC information is typically sent once every forty subframes (i.e., much less frequently than PDCCH signaling information). Dynamic configuration of contention-based access parameters can be performed via PDCCH signaling. This allows the configuration data to be changed every subframe, which may incur high PDCCH overhead. If contention-based access is only used when system load is low, then PDCCH overhead may not be an issue. However, the provision of contention-based configuration data can also be performed in a semi-persistent manner to save PDCCH overhead if needed. (Semi-persistent is defined herein to mean that the configuration is provided once and remains valid for a certain amount of time or until canceled.) Such a methodology allows contention-based access to be supported for other purposes, for example machine-type communication.

Figure 4:
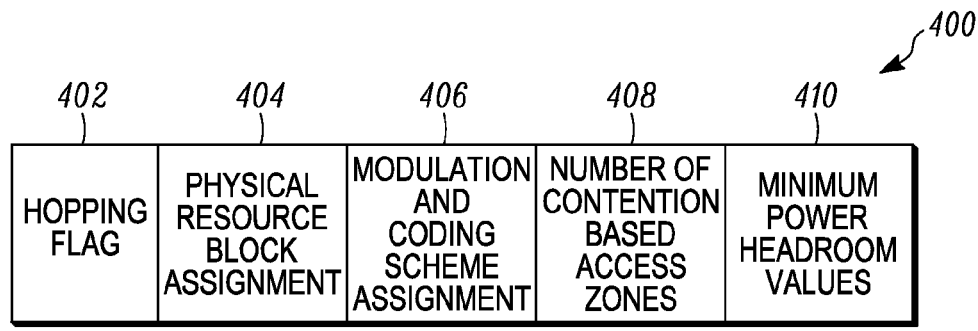
FIG. 4 is a diagram that illustrates exemplary data fields associated with contention-based configuration data.

To accommodate PDCCH configuration of contention-based access, a new downlink control information (DCI) format is defined. This new DCI format may be considered to be a contention-based access uplink grant, and it may be based on the existing uplink grant structure defined in the LTE specification. In this regard, FIG. 4 is a diagram that illustrates exemplary data fields associated with contention-based configuration data 400. The configuration data 400 can be sent from the eNB 102 to the UE devices 104 in an appropriate signaling channel, e.g., the PDCCH, and in an appropriate format. Thus, the configuration data 400 could be updated in a dynamic manner, once every subframe. In certain embodiments, the configuration data 400 is sent using RRC.

Although the content of the contention-based configuration data 400 may vary from one embodiment to another, the configuration data 400 for this example includes: a hopping flag 402; physical resource block assignment data 404; MCS data 406; zone data 408 associated with the contention-based resource zones; and minimum power headroom data 410. The hopping flag 402 is used to provide frequency diversity, as called for in the LTE specification, 3GPP TS 36.213 V9.2.0 (2010-06), Section 8.4. The physical resource block assignment data 404 identifies the PRBs assigned to each contention-based resource block. In practice, therefore, a given PRB can be assigned to only one contention-based resource block at any given time. As explained above, multiple contention-based resource zones may be configured. This allows different zones to be defined to lower collision probability. Moreover, different zones can be used to support different MCSs, data packet sizes, or data rates. Accordingly, the MCS data 406 is utilized to identify the particular MCSs that are assigned to each contention-based resource zone. The zone data 408 identifies the plurality of different contention-based resource zones in an appropriate manner. For example, the zone data 408 may indicate the number of contention-based resource zones available to the UE devices, the size of each contention-based resource zone, etc. In practice, the zone data 408 and the physical resource block assignment data 404 could be merged together into a single field.

The minimum power headroom data 410 identifies a respective minimum power headroom value for each of the contention-based resource zones. The minimum power headroom value that is obtained or defined for each contention-based access zone can be considered by the UE devices when determining which contention-based access zone (if any) to use for uplink access. This ensures that a transmitting UE device meets the stated minimum power requirement before it can transmit in a contention-based access zone. Thus, the UE device will not waste power on an uplink transmission that cannot be decoded at the eNB due to inadequate transmission power. The manner in which the UE devices process the minimum power headroom values is described in more detail below.

Figure 5:
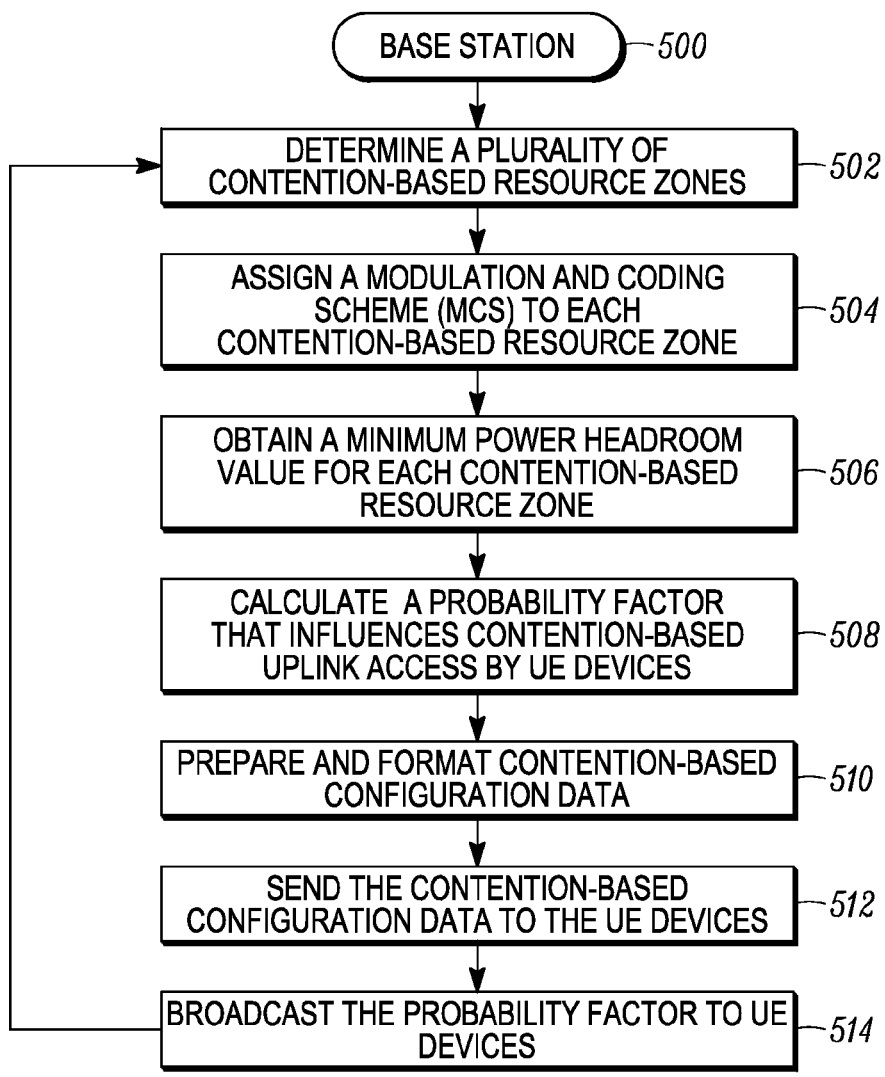
FIG. 5 is a flow chart that illustrates an exemplary operating process performed by a base station.

As mentioned previously, the eNB sends the contention-based configuration data 400 to the UE devices. In this regard, FIG. 5 is a flow chart that illustrates an exemplary operating process 500 performed by a base station (e.g., an eNB). The process 500 relates to the provision of the contention-based configuration data to the UE devices supported by that particular eNB. The various tasks performed in connection with a process described herein (such as the process 500) may be performed by software, hardware, firmware, or any combination thereof. For illustrative purposes, a described process may refer to elements mentioned above in connection with FIGS. 1-4. In practice, portions of a described process may be performed by different elements of the described system, e.g., a base station, a UE device, a network infrastructure device, or the like. It should be appreciated that a described process may include any number of additional or alternative tasks, the tasks shown in a figure need not be performed in the illustrated order, and a described process may be incorporated into a more comprehensive procedure or process having additional functionality not described in detail herein. Moreover, one or more of the tasks shown in a figure could be omitted from an embodiment of the depicted process as long as the intended overall functionality remains intact.

For this particular implementation, the process 500 is performed by an eNB. The process 500 may begin with the eNB determining a plurality of contention-based resource zones to be used for the PUSCH of that eNB (task 502). In practice, the number of contention-based resource zones and the PRBs assigned to each contention-based resource zone may be determined in response to system load, expected data packet sizes (e.g., TCP/IP acknowledgement, voice-over-IP packet), number of machine-type users, past collisions, etc.). The process 500 also assigns a modulation and coding scheme (MCS) to each of the contention-based resource zones (task 504). In certain embodiments, task 504 assigns different MCSs to the contention-based resource zones. In practice, the MCSs can be assigned to support different data rates, quality of service, and the like. MCS selection for each zone can be performed based on, for example, expected channel quality of UEs that are near or far from the eNB, or in the middle of the cell (near, mid, far). In this regard, LTE specification 36.213 V9.2.0 (2010-06), Section 7.1.7 includes a table of available MCS levels.

The eNB will also obtain minimum power headroom values for the contention-based resource zones (task 506), expressed in appropriate units such as dBm. In this regard, each contention-based resource zone will have a respective minimum power headroom value assigned thereto. The minimum power headroom values will be considered by the UE devices prior to using contention-based uplink access to the eNB. The minimum power headroom value for a given contention-based resources zone will be influenced at least in part by the particular MCS assigned to that zone, because the power requirements for each MCS might vary. Thus, the minimum power headroom values are correlated to the assigned MCSs. Depending upon the system implementation, the current operating conditions, and/or other factors, the minimum power headroom values may be different for each of the contention-based resource zones, or at least two of the minimum power headroom values might be the same.

When system load is low, collision may not be an issue with contention-based uplink access. However, the load may change from time to time and the eNB should have the ability to manage collision. Accordingly, a probability factor can be sent to a UE device for use when deciding whether it can transmit using a contention-based resource. The probability factor influences whether UE devices in the system actually perform contention-based uplink transmission. For example, under very light load conditions (where collisions are unlikely), the UE devices should have a relatively high probability of utilizing contention-based uplink resources. On the other hand, under high load conditions (where collisions are more likely), the UE devices should have a lower probability of utilizing contention-based uplink resources. The eNB can manage contention-based uplink access by the UE devices by updating the probability factor as needed to reflect dynamically changing system conditions. The illustrated embodiment of the process 500 assumes that the eNB is responsible for calculating (task 508) a probability factor that influences contention-based uplink access by the UE devices in the manner described above. In practice, the probability factor may be calculated based upon current operating conditions such as system loading, available resources, the number of UE devices actively supported by the eNB, and the like. It should be understood however, that calculating a probability factor is optional and not essential to the method.

The process 500 may continue by preparing and formatting the contention-based configuration data in an appropriate manner that is suitable for transmission to the UE devices (task 510). In practice, the controller of the eNB can perform task 510 to package, format, or otherwise arrange the contention-based configuration data for transport via one or more signaling channels (e.g., the PDCCH). For example, the contention-based configuration data can be prepared in a predefined message format with designated fields for the various types of configuration information described above with reference to FIG. 4. This enables the eNB to send the contention-based configuration data to the UE devices (task 512) in a format that is recognized and understood by the UE devices. The eNB could also broadcast or otherwise send the calculated probability factor to the UE devices (task 514). For example, the probability factor could be transmitted on the physical broadcast channel (PBCH). Alternatively (or additionally), the probability factor can be sent dynamically in the PDCCH. In this regard, the probability factor could be included in a field of the contention-based configuration data, along with the fields for the other configuration information depicted in FIG. 4.

Some or all of the process 500 can be repeated as often as necessary or desired. Indeed, the contention-based configuration data and/or the probability factor could be updated once every subframe, once every frame, or at any designated interval. Accordingly, FIG. 5 depicts the process 500 repeating after task 514. The illustrated embodiment assumes that tasks 502, 504, and 506 are repeated for each iteration. In practice, however, the number, size, and arrangement of the contention-based resource zones, the MCSs assigned to each zone, and/or the minimum power headroom value assigned to each zone could be fixed after their initial determination or calculation. In other embodiments, the number, size, and arrangement of the contention-based resource zones, the MCSs assigned to each zone, and/or the minimum power headroom value assigned to each zone could be updated less frequently than the probability factor. These and other variations of the process 500 are contemplated by this disclosure.

Figure 6:
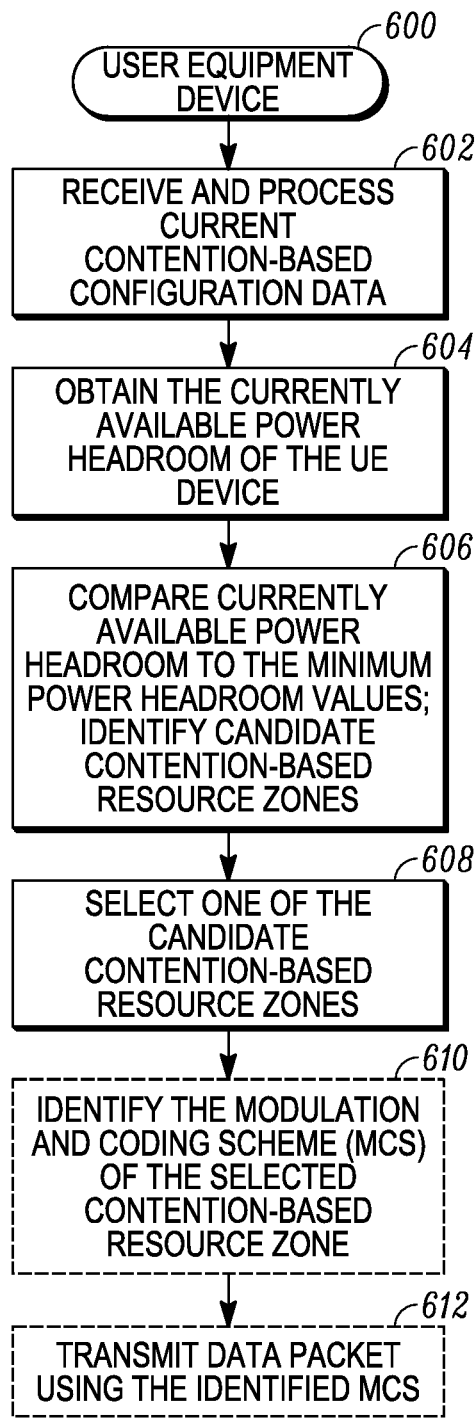
FIGS. 6-9 are flow charts that illustrate exemplary operating processes performed by a user equipment device.

The UE devices can use contention-based uplink access to minimize latency and to transmit occasional packets without incurring high overload. In this regard, FIG. 6, is a flow chart that illustrates an exemplary operating process 600 performed by a UE device. The process 600 begins with the UE device receiving and processing contention-based configuration data, which is sent by the eNB (task 602). In preferred embodiments, the received contention-based configuration data includes at least the information mentioned above with reference to FIG. 4.

If the UE device determines that contention-based uplink access should not be used at this time, then the UE device can perform uplink access using a dedicated and scheduled transmission scheme. If, however, the UE device decides to use contention-based uplink access, then the process 600 continues by obtaining, calculating, or otherwise determining its currently available power headroom (task 604). In practice, the UE device can perform certain self-monitoring or self-diagnostic procedures to obtain its currently available power headroom in a real-time or virtually real-time manner. The currently available power headroom value can then be compared to the minimum power headroom values associated with the available contention-based resource zones (task 606). As mentioned above, these minimum power headroom values are received as part of the contention-based configuration data, as depicted in FIG. 4. Ideally, the currently available power headroom of the UE device will exceed all of the received minimum power headroom values, thus enabling the UE device to use any of the contention-based resource zones. In practice, however, the currently available power headroom may not satisfy one or more of the received minimum power headroom values. Accordingly, task 606 may identify a subset (which may be a proper subset or the entire set) of the contention-based resource zones for which the currently available power headroom of the UE device satisfies the respective minimum power headroom values. In other words, task 606 identifies certain candidate zones that can be reliably used by the UE device.

The UE device may then select one of the zones from the identified subset of contention-based resource zones (task 608). This selection may be performed randomly, in an ordered fashion, or according to any specified rule or algorithm. For example, the selection may favor zones that support higher data rates, or it may favor zones having lower minimum power headroom requirements. The selected zone may be considered to be the transmit resource zone for this iteration of the process 600. In addition, the process 600 may proceed with one or more optional steps (shown in dashed lines) if so desired. For example, the process 600 identifies or obtains the MCS assigned to the selected transmit resource zone (task 610) and configures the UE device in an appropriate manner to support that MCS. Thereafter, the UE device transmits a data packet using the selected contention-based resource zone and using the MCS associated with the selected zone (task 612). For this embodiment, the data is transmitted with the identifier of the UE device (e.g., its C-RNTI) and a buffer status report if there is additional data in the buffer of the UE device. This information allows the eNB to determine the identify of each transmitting UE device and to determine how best to handle and process the received data.

Figure 7:
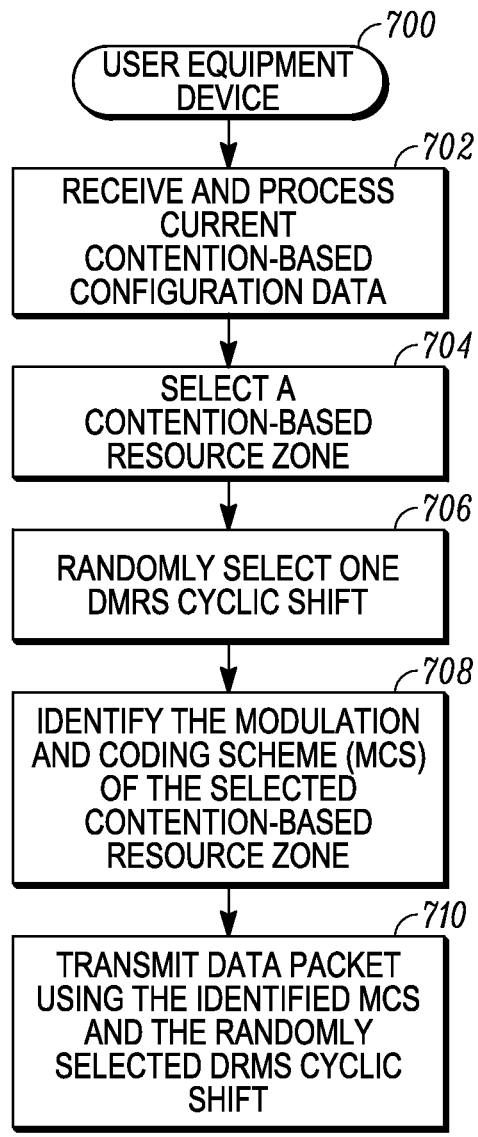

FIG. 7 is a flow chart that illustrates another exemplary operating process 700 performed by a UE device. The process 700 begins with the UE device receiving and processing contention-based configuration data, which is sent by the eNB (task 702). In preferred embodiments, the received contention-based configuration data includes at least the information mentioned above with reference to FIG. 4.

If the UE device determines that contention-based uplink access should not be used at this time, then the UE device can perform uplink access using a dedicated and scheduled transmission scheme. If, however, the UE device decides to use contention-based uplink access, then the process 700 continues by selecting one of the contention-based resource zones identified in the contention-based configuration data (task 704). This selection may be performed randomly, in an ordered fashion, or according to any specified rule or algorithm. For example, the selection may favor zones that support higher data rates, or it may favor zones having lower minimum power headroom requirements. The selected zone may be considered to be the transmit resource zone for this iteration of the process 700. In addition, the process 700 randomly selects one DMRS cyclic shift (task 706) to be used for the uplink transmission. The process 700 also identifies or obtains the MCS assigned to the selected transmit resource zone (task 708) and configures the UE device in an appropriate manner to support that MCS. Thereafter, the UE device transmits a data packet using the selected contention-based resource zone, using the MCS associated with the selected zone, and using the randomly selected DMRS cyclic shift (task 710). For this embodiment, the data is transmitted with the identifier of the UE device (e.g., its C-RNTI) and a buffer status report if there is additional data in the buffer of the UE device. This information allows the eNB to determine the identify of each transmitting UE device and to determine how best to handle and process the received data.

Figure 8:
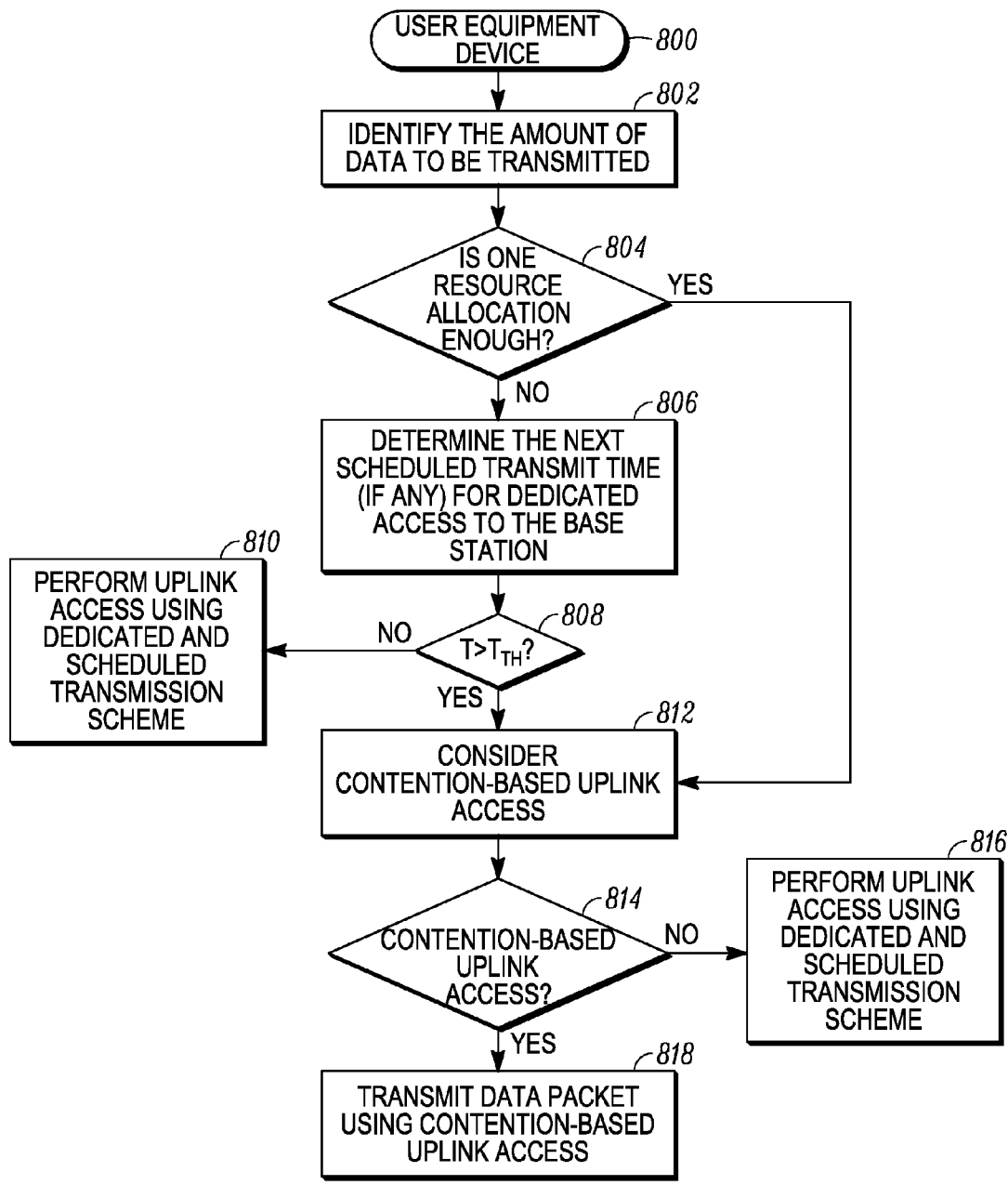

FIG. 8 is a flow chart that illustrates another exemplary operating process 800 performed by a UE device. The process 800 assumes that the UE device has some data that needs to be sent to the eNB. Accordingly, the process 800 may identify the amount of data to be transmitted from the UE device to the eNB (task 802). The identified amount of data can then be used as a factor in determining whether the UE device will utilize contention-based uplink access or dedicated and scheduled uplink access. For example, the UE device may compare the identified amount of data to a data capacity or threshold amount corresponding to a single physical resource allocation. If all of the identified amount of data can be transmitted using only one physical resource allocation (query task 804), then the process 800 allows contention-based uplink access (task 812) to be considered. In other words, if only one physical resource allocation is required to accommodate all of the identified amount of data, then contention-based access to the eNB might be a viable candidate (whether or not contention-based access is actually used might be subject to other factors, as described below). As used here, "one" physical resource allocation means the resource allocation configured for contention-based access. Thus, if a relatively small amount of data needs to be transmitted by the UE device, it may be possible to use contention-based access. For example, if contention-based access is configured to support 100 bits, but the packet size is 400 bits, then four different transmissions would be required. In such a situation, contention-based access should be avoided because the likelihood that all four transmissions will be successful without collision would be relatively low and it might take an undesirably long amount of time to successfully send and receive all the data. Instead, one dedicated transmission will accommodate all 400 bits at once.

If, however, the identified amount of data cannot be transmitted using only one physical resource allocation (query task 804), then the process 800 determines or identifies the next scheduled transmit time (if any) for dedicated access to the eNB (task 806). It should be realized that task 806 assumes that the UE device is suitably configured to support both contention-based uplink access and traditional dedicated and scheduled uplink access methodologies. In practice, the next scheduled transmit time may be associated with an SRI. In particular, the next scheduled transmit time may be dictated by the current SRI period of the UE device. For this particular embodiment, the UE device compares the time until the next scheduled transmit time (T) to a threshold amount of time ($T_{TH}$). If the time until the next scheduled transmit time is not greater than the designated threshold amount of time (query task 808), then contention-based uplink access is not allowed and the UE device performs uplink access using the dedicated and scheduled transmission scheme (task 810). In this situation, the UE device may transmit a data packet containing at least some of the identified amount of data, using scheduled dedicated access to the eNB. In other words, the UE device uses scheduled dedicated uplink access when both: (a) the time until the next scheduled transmit time is shorter than the threshold amount of time; and (b) the identified amount of data cannot be transmitted using only one resource allocation.

If, however, the time until the next scheduled transmit time is longer than the designated threshold amount of time (query task 808), then the process 800 allows the UE device to consider contention-based uplink access (task 812). Whether or not contention-based access is actually used might be subject to other factors, as described below. In practice, the threshold amount of time may be equal to the time associated with a fixed number of subframes or frames, if so desired. For example, the threshold amount of time might correspond to the time normally used for the transmission of three subframes (e.g., three milliseconds).

If the UE device determines that contention-based uplink access should not be used at this time (query task 814), then the UE device performs uplink access using the dedicated and scheduled transmission scheme (task 816). If, however, the UE device decides to use contention-based uplink access, then the UE device transmits a data packet using the contention-based uplink access scheme (task 818). For this embodiment, the data is transmitted with the identifier of the UE device (e.g., its C-RNTI) and a buffer status report if there is additional data in the buffer of the UE device. This information allows the eNB to determine the identify of each transmitting UE device and to determine how best to handle and process the received data.

Figure 9:
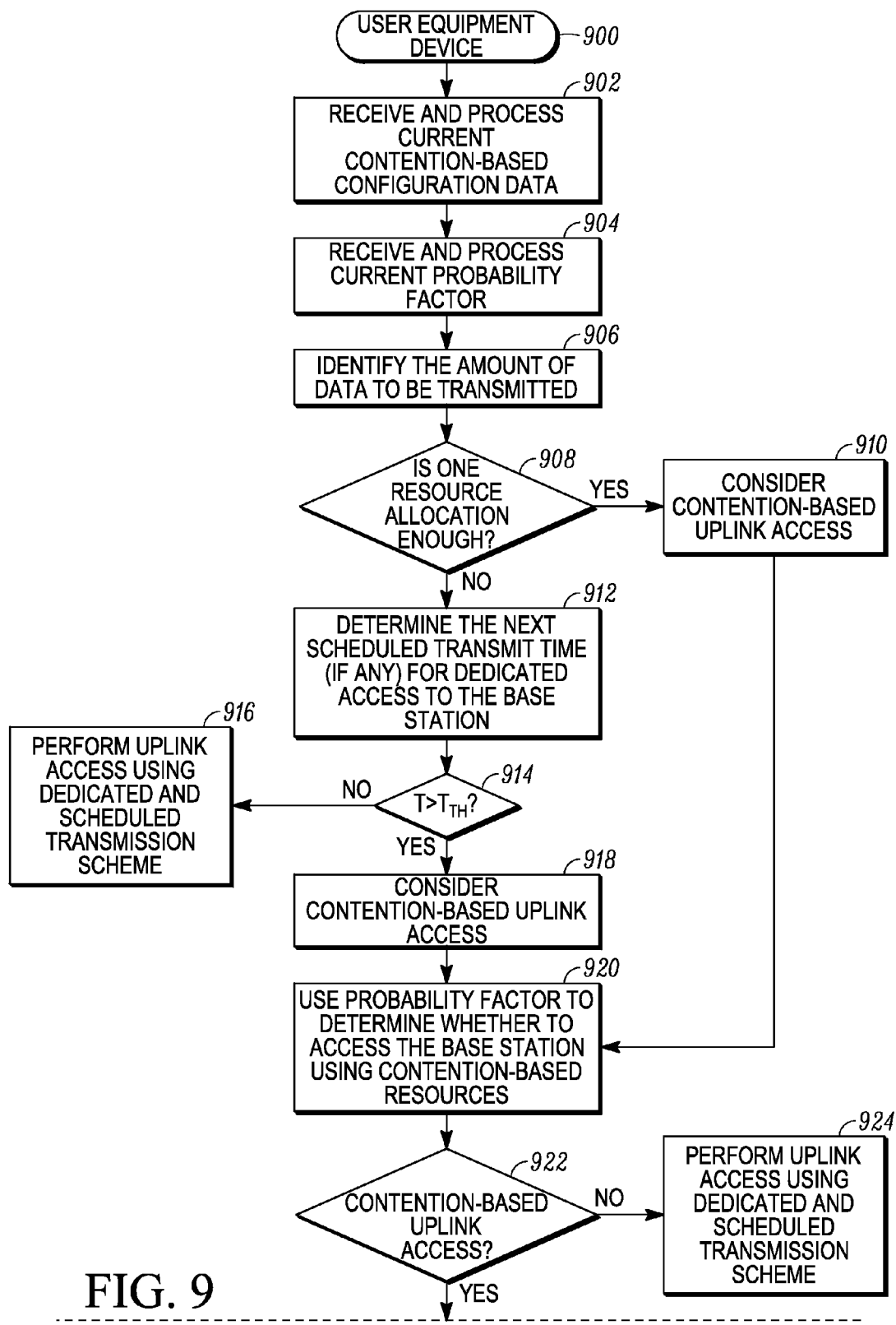

A basic UE procedure for transmitting on a contention-based resource is presented here with reference to FIG. 9, which is a flow chart that illustrates an exemplary operating process 900 performed by a UE device. The process 900 begins with the UE device receiving and processing contention-based configuration data, which is sent by the eNB (task 902). In preferred embodiments, the received contention-based configuration data includes at least the information mentioned above with reference to FIG. 4. The UE device may also receive and process the current probability factor, which may be broadcast or otherwise transmitted by the eNB (task 904).

The process 900 assumes that the UE device has some data that needs to be sent to the eNB. Accordingly, the process 900 may identify the amount of data to be transmitted from the UE device to the eNB (task 906). The identified amount of data can then be used as a factor in determining whether the UE device will utilize contention-based uplink access or dedicated and scheduled uplink access. For example, the UE device may compare the identified amount of data to a data capacity or threshold amount corresponding to a single physical resource allocation. If all of the identified amount of data can be transmitted using only one physical resource allocation (query task 908), then the process 900 allows contention-based uplink access (task 910) to be considered. In other words, if only one physical resource allocation can accommodate all of the identified amount of data, then contention-based access to the eNB might be a viable candidate (whether or not contention-based access is actually used might be subject to other factors, as described below). As used here, "one" physical resource allocation means the resource allocation configured for contention-based access. Thus, if a relatively small amount of data needs to be transmitted by the UE device, it may be possible to use contention-based access. For example, if contention-based access is configured to support 100 bits, but the packet size is 400 bits, then four different transmissions would be required. In such a situation, contention-based access should be avoided because the likelihood that all four transmissions will be successful without collision would be relatively low and it might take an undesirably long amount of time to successfully send and receive all the data. Instead, one dedicated transmission will accommodate all 400 bits at once.

If, however, the identified amount of data cannot be transmitted using only one physical resource allocation (query task 908), then the process 900 determines or identifies the next scheduled transmit time (if any) for dedicated access to the eNB (task 912). It should be realized that task 912 assumes that the UE device is suitably configured to support both contention-based uplink access and traditional dedicated and scheduled uplink access methodologies. In practice, the next scheduled transmit time may be associated with an SRI. In particular, the next scheduled transmit time may be dictated by the current SRI period of the UE device. For this particular embodiment, the UE device compares the time until the next scheduled transmit time (T) to a threshold amount of time ($T_{TH}$). If the time until the next scheduled transmit time is not greater than the designated threshold amount of time (query task 914), then contention-based uplink access is not allowed and the UE device performs uplink access using the dedicated and scheduled transmission scheme (task 916). In this situation, the UE device may transmit a data packet containing at least some of the identified amount of data, using scheduled dedicated access to the eNB. In other words, the UE device uses scheduled dedicated uplink access when both: (a) the time until the next scheduled transmit time is shorter than the threshold amount of time; and (b) the identified amount of data cannot be transmitted using only one resource allocation.

If, however, the time until the next scheduled transmit time is longer than the designated threshold amount of time (query task 914), then the process 900 allows the UE device to consider contention-based uplink access (task 918). Whether or not contention-based access is actually used might be subject to other factors, as described below. In practice, the threshold amount of time may be equal to the time associated with a fixed number of subframes or frames, if so desired. For example, the threshold amount of time might correspond to the time normally used for the transmission of three subframes (e.g., three milliseconds).

If the process 900 allows contention-based uplink access to be considered (via task 910 or task 918), then the UE device uses the current probability factor to determine whether to access the eNB using contention-based resources (task 920). Thus, the probability factor influences whether the UE device actually performs contention-based uplink transmission. Indeed, whether or not the UE device uses the contention-based uplink access scheme is dictated by the probability factor. As one non-limiting example, the probability factor (p) is a number such that $0 \leq p < 1$. The UE device decides to transmit using a contention-based resource with the probability (1−p). If the UE device does not utilize contention-based uplink access at this time, then its next decision (assuming that a new probability factor is not received) will be governed by the probability (1−p$^2$), and so on.

If the UE device determines that contention-based uplink access should not be used at this time (query task 922), then the UE device performs uplink access using the dedicated and scheduled transmission scheme (task 924). If, however, the UE device decides to use contention-based uplink access, then the process 900 continues by obtaining, calculating, or otherwise determining its currently available power headroom (task 926). In practice, the UE device can perform certain self-monitoring or self-diagnostic procedures to obtain its currently available power headroom in a real-time or virtually real-time manner. The currently available power headroom value can then be compared to the minimum power headroom values associated with the available contention-based resource zones (task 928). As mentioned above, these minimum power headroom values are received as part of the contention-based configuration data, as depicted in FIG. 4. Ideally, the currently available power headroom of the UE device will exceed all of the received minimum power headroom values, thus enabling the UE device to use any of the contention-based resource zones. In practice, however, the currently available power headroom may not satisfy one or more of the received minimum power headroom values. Accordingly, task 928 may identify a subset (which may be a proper subset or the entire set) of the contention-based resource zones for which the currently available power headroom of the UE device satisfies the respective minimum power headroom values. In other words, task 928 identifies certain candidate zones that can be reliably used by the UE device.

The UE device may then select one of the zones from the identified subset of contention-based resource zones (task 930). This selection may be performed randomly, in an ordered fashion, or according to any specified rule or algorithm. For example, the selection may favor zones that support higher data rates, or it may favor zones having lower minimum power headroom requirements. The selected zone may be considered to be the transmit resource zone for this iteration of the process 900. In addition, the process 900 randomly selects one DMRS cyclic shift (task 932) to be used for the uplink transmission. The process 900 also identifies or obtains the MCS assigned to the selected transmit resource zone (task 934) and configures the UE device in an appropriate manner to support that MCS. Thereafter, the UE device transmits a data packet using the selected contention-based resource zone, using the MCS associated with the selected zone, and using the randomly selected DMRS cyclic shift (task 936). For this embodiment, the data is transmitted with the identifier of the UE device (e.g., its C-RNTI) and a buffer status report if there is additional data in the buffer of the UE device. This information allows the eNB to determine the identity of each transmitting UE device and to determine how best to handle and process the received data.

With the procedure described above, a UE device uses a contention-based zone if the expected latency of waiting for contention-free access is comparatively higher, or if the efficiency of using contention-based access is greater. If the amount of data to be transmitted is relatively low, (e.g. in machine-type communication), the UE devices need not be allocated uplink control signaling such as Channel Quality Information (CQI) and SRI, and may instead be instructed to use contention-based access. In this regard, CQI/SRI set-up is part of dedicated uplink control signaling, which consumes uplink resources. Accordingly, this approach can reduce uplink overhead.

In addition, additional restrictions can be placed on contention-based access if so desired. For example, restrictions based on traffic types can be defined. Thus, guaranteed bit rate (GBR) flows with packet delay budget less than a defined amount ($T_d$) could have sub-priority among certain classes (e.g., gaming has higher priority than conversational-video). On the other hand, non-GBR flows would be allowed access but no further buffer status reports will be served (e.g., TCP ACK/NACK only). Restrictions can also be placed based on traffic activities. For instance, contention-based access is not allowed if the UE device has sent SRI and is still waiting for an uplink grant, or if the UE device has received an uplink grant, or if the UE device has already sent data to the eNB with a buffer status report. In this case, the UE device already has been or will soon be assigned dedicated resources, so contention-based access is not likely to reduce latency.

Figure 10:
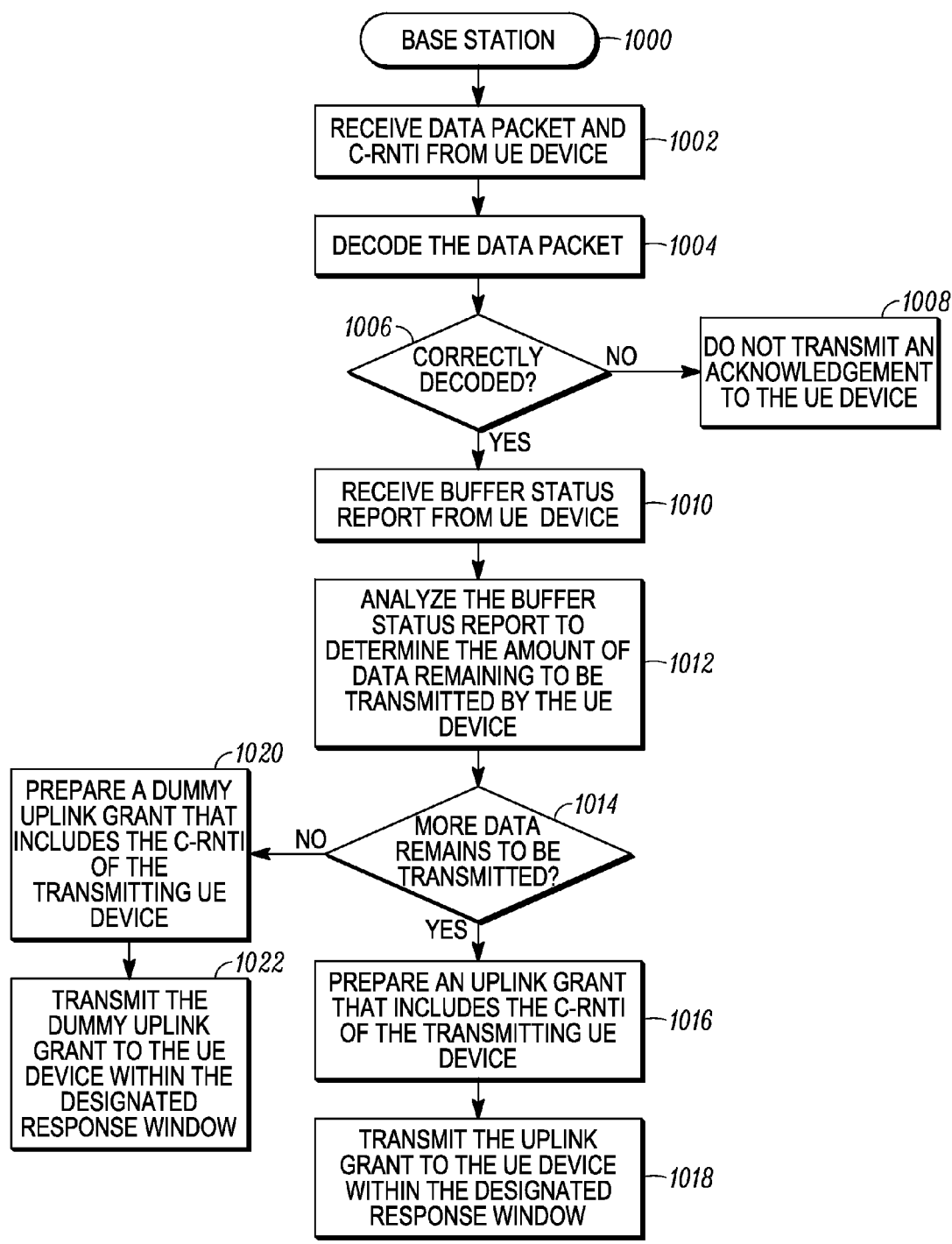
FIG. 10 is a flow chart that illustrates another exemplary operating process performed by a base station.
Figure 11:
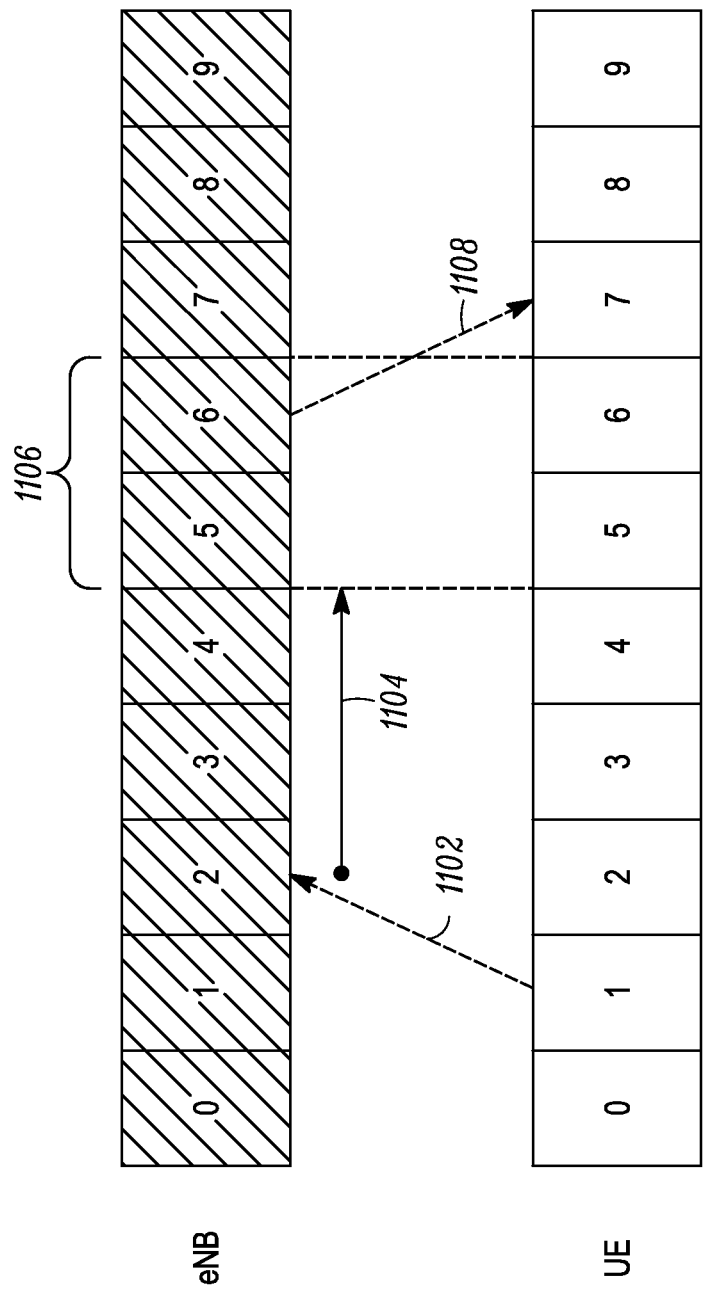
FIG. 11 is a diagram that illustrates timing associated with the uplink transmission of a data packet and the downlink transmission of a corresponding acknowledgement message.

The system 100 described here also considers how the eNB will process data received via contention-based resources. In this regard, FIG. 10 is a flow chart that illustrates another exemplary operating process 1000 performed by a base station, and FIG. 11 is a diagram that illustrates timing associated with the uplink transmission of a data packet and the downlink transmission of a corresponding acknowledgement message. The numbered squares in FIG. 11 represent data packets, time slots, time blocks, or any predefined period associated with the operation of the eNB and the UE, with time increasing to the right.

Referring to FIG. 10, the process 1000 begins with the eNB receiving a data packet from a UE device (task 1002) via contention-based uplink access. For this particular embodiment, the received data packet includes an identifier that uniquely identifies the transmitting UE device within the domain of the system. The identifier may be, for example, a C-RNTI. The eNB decodes (or attempts to decode) the received data packet (task 1002). The eNB may also perform one or more tests or checks to determine whether or not the data was decoded correctly. For example, the eNB could perform a cyclic redundancy check (CRC) on the decoded data. If the received data packet was not correctly decoded (query task 1006), then the eNB does not transmit an acknowledgment message to the UE device within the designated response window (task 1008). Consequently, if the UE device does not receive an acknowledgement message within the designated response window, then it will assume that the eNB either did not receive the data packet or did not correctly decode the data packet. Accordingly, the UE device can then either transmit the data packet again using contention-based access or it can wait for the next SRI slot to send a scheduling request to the eNB.

Certain exemplary embodiments of the system 100 use uplink grant messages as acknowledgement messages. Therefore, if the UE device does not receive an uplink grant within the designated response window, then it assumes that the eNB did not correctly decode the data packet. The use of uplink grant messages in this manner is desirable because the format and use of uplink grants are already defined in the LTE specification. Accordingly, if the received data packet is not correctly decoded, then the eNB will not send an uplink grant back to the UE device (task 1008). It should be appreciated that an uplink grant represents control information sent on the PDCCH that provides information about how the UE device will access the system in the uplink. For dedicated access, an uplink grant is addressed to a UE device (using, for example, the C-RNTI). For contention-based access, an uplink grant will address a special RNTI that is common to all UE devices (i.e., all UE devices will try to read this grant). Information fields/contents for an uplink grant are defined in 3GPP specification 36.212 V9.2.0 (2010-06), Section 5.3.3.1.1. They include, for instance, MCS, hopping field, DMRS, and power control information. The UE device knows whether the grant is successfully received if it successfully decodes the information (CRC check of message is good).

If the received data packet is correctly decoded, then the eNB may also receive a buffer status report from the UE device; the buffer status report could be received with the data packet (task 1010). The buffer status report indicates an amount of data remaining to be transmitted by the UE device. Note that the buffer status report could indicate that no additional data remains to be transmitted. In FIG. 11, the arrow 1102 represents the contention-based uplink transmission of the data packet, the C-RNTI, and the buffer status report from the UE device to the eNB. Upon receipt of this information, the eNB can perform the necessary processing, decoding, analysis, and handling during a processing time period. In FIG. 11, the arrow 1104 represents this processing time period. It should be appreciated that the actual processing time period 1104 could span any number of time "blocks," and that FIG. 11 is merely exemplary.

Referring back to FIG. 10, the eNB analyzes the received buffer status report to determine the amount of data remaining to be transmitted by the UE device (task 1012) and the process 1000 checks whether more data remains to be transmitted by the UE device (query task 1014). As described above, the eNB can consult the buffer status report to determine whether more data remains to be transmitted. When more data remains to be transmitted by the UE device, the eNB prepares an uplink grant that includes or otherwise indicates the C-RNTI of the transmitting UE device (task 1016). Notably, this uplink grant is prepared in accordance with the LTE specification because it actually serves as a true uplink grant that enables the UE device to transmit its remaining data using the traditional dedicated and scheduled resource approach. This uplink grant is transmitted to the originating UE device within the designated response window, via a signaling channel such as the PDCCH (task 1018). It should be appreciated that this uplink grant serves at least two purposes: (1) as an acknowledgement message; and (2) as a grant that enables the UE device to transmit its remaining data using dedicated and scheduled resources. The inclusion of the C-RNTI in this uplink grant enables the UE device to confirm that the uplink grant represents an acknowledgement message for its recently transmitted data packet.

Referring again to FIG. 11, the response window 1106 for this example is two time blocks (from the perspective of the eNB). Of course, the response window 1106 could be defined to be any number of time blocks corresponding to any number of packets, time slots, etc. As shown in FIG. 11, the acknowledgement message 1108 (e.g., the uplink grant) is sent before the response window 1106 lapses.

If query task 1014 determines that no additional data remains to be transmitted by the UE device, then the process 1000 prepares a dummy uplink grant that includes or otherwise indicates the C-RNTI of the transmitting UE device (task 1020). As used here, a "dummy" uplink grant is one that serves only as an acknowledgement message. In other words, a dummy uplink grant does not function as a true grant as defined by the LTE specification. Consequently, a dummy uplink grant will convey less contextual information than an actual uplink grant, although it will have the same size, format, and fields as defined in a "normal" uplink grant, however, some of the fields will be set to an invalid or reserved state so that the UE device will detect the message as a dummy uplink grant rather than a normal uplink grant. Therefore, the content of the acknowledgement message (i.e., the uplink grant) is influenced by the amount of data remaining to be transmitted by the UE device. The dummy uplink grant is transmitted to the originating UE device within the designated response window, via a signaling channel such as the PDCCH (task 1022). Again, the inclusion of the C-RNTI in this dummy uplink grant enables the UE device to confirm that the dummy uplink grant represents an acknowledgement message for its recently transmitted data packet.

Notably, an uplink grant (whether an actual grant or a dummy grant) serves as an implicit ACK to let the UE device know that the eNB has successfully received and decoded the data packet. If the UE device has more data to transmit, the grant will be an actual uplink grant, and an additional uplink resource will be allocated to the UE device in a conventional manner. If the UE device does not receive an uplink grant (actual or dummy) within the predefined response window, then the UE device will proceed as if it had received a NACK. Using this approach, contention resolution is managed using uplink grants (actual grants and dummy grants). Alternately, an ACK format can be created for transmission using the PDCCH, where the eNB echoes back all C-RNTIs conveyed with data packets that were correctly decoded.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of operating a base station in a wireless communication system, the method comprising:
   receiving a data packet from a user equipment device via contention-based uplink access, the data packet comprising an identifier that uniquely identifies the user equipment device in the wireless communication system;
   decoding the received data packet;
   when the received data packet is correctly decoded,
      receiving a buffer status report with the data packet, the buffer status report indicating an amount of data remaining to be transmitted by the user equipment device;
      analyzing the buffer status report to determine the amount of data remaining to be transmitted by the user equipment device;
      preparing an acknowledgment message such that its content is influenced by the amount of data remaining to be transmitted by the user equipment device;
      sending the acknowledgment message to the user equipment device within a designated response window, the acknowledgment message comprising the identifier of the user equipment device, wherein the acknowledgement message is sent using a signaling channel between the base station and the user equipment device.

2. The method of claim 1, wherein the sending step sends the acknowledgement message using a physical downlink control channel (PDCCH).

3. The method of claim 1, wherein the identifier of the user equipment device comprises a cell radio network temporary identifier (C-RNTI).

4. The method of claim 1, wherein:
   preparing an acknowledgment message comprises preparing the acknowledgment message in the form of an uplink grant when the buffer status report indicates that data remains to be transmitted by the user equipment device; and
   the uplink grant includes the identifier of the user equipment device.

5. The method of claim 1, wherein:
   preparing an acknowledgment message comprises preparing the acknowledgment message in the form of a dummy uplink grant when the buffer status report indicates that no data remains to be transmitted by the user equipment device; and
   the dummy uplink grant includes the identifier of the user equipment device.

6. The method of claim 1, wherein the acknowledgment message is in the form of an uplink grant.

7. A method of operating a user equipment device in a wireless communication system, the method comprising:
   identifying an amount of data to be transmitted from the user equipment device to a base station in the wireless communication system;
   determining a next scheduled transmit time for dedicated access to the base station;
   transmitting, using contention-based access to the base station, a data packet containing the identified amount of data when one of the time until the next scheduled transmit time is longer than a threshold amount of time and only one resource allocation is required to accommodate all of the identified amount of data; and
   transmitting, using scheduled dedicated access to the base station, a data packet containing at least some of the identified amount of data when both (a) the time until the next scheduled transmit time is shorter than the threshold amount of time and (b) the identified amount of data cannot be transmitted using only one resource allocation.

8. The method of claim 7, wherein the next scheduled transmit time is associated with a scheduling request indicator.

9. The method of claim 7, wherein the threshold amount of time corresponds to a fixed number of subframes.

10. The method of claim 7, wherein one resource allocation comprises an amount of resource elements allocated to one contention-based access zone.

11. A user equipment device for operation in a wireless communication system, the user equipment device comprising:
a wireless communication module that supports a shared channel and a scheduled dedicated access channel between the user equipment device and a base station in the wireless communication system; and
a processor module operatively associated with the wireless communication module, wherein the processor module identifies an amount of data to be transmitted from the user equipment device to a base station in the wireless communication system, determines a next scheduled transmit time for dedicated access to the base station, compares the time until the next scheduled transmit time to a threshold amount of time, and compares the identified amount of data to a data capacity corresponding to a single resource allocation; wherein
the processor module instructs the wireless communication module to transmit, using contention-based access via the shared channel, a data packet containing at least some of the identified amount of data when the time until the next scheduled transmit time is longer than the threshold amount of time;
the processor module instructs the wireless communication module to transmit, using contention-based access via the shared channel, the identified amount of data when the data capacity can accommodate all of the identified amount of data; and
the processor module instructs the wireless communication module to transmit, using the scheduled dedicated access channel, a data packet containing at least some of the identified amount of data when both (a) the time until the next scheduled transmit time is shorter than the threshold amount of time and (b) the data capacity cannot accommodate all of the identified amount of data.

12. The user equipment device of claim 11, wherein the next scheduled transmit time is associated with a scheduling request indicator.

13. The user equipment device of claim 11, wherein the threshold amount of time corresponds to a fixed number of subframes.

14. The user equipment device of claim 11, wherein one resource allocation comprises an amount of resource elements allocated to one contention-based access zone.

* * * * *